United States Patent Office 3,095,424
Patented June 25, 1963

3,095,424
3,5-DIARYL-3-PYRROLIDINOLS
Yao Hua Wu, Rolland Frederick Feldkamp, and William Andrew Gould, Evansville, Ind., assignors to Mead Johnson & Company, Evansville, Ind., a corporation of Indiana
No Drawing. Filed Aug. 14, 1961, Ser. No. 131,065
9 Claims. (Cl. 260—326.5)

This invention concerns compositions comprising 3,5-diaryl-3-pyrrolidinols of the following formula, the acid addition salts thereof, processes for the production of these substances, and their use in the treatment of certain disease conditions.

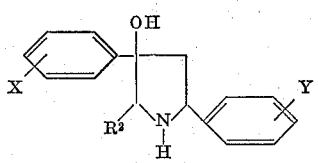

In the above formula, X and Y are each independently selected from the following group of substituents: hydrogen, hydroxy, dihydroxy, halo, dihalo, alkyl, dialkyl, alkoxy, phenoxy, halophenoxy, phenyl, halophenyl, methylenedioxy, benzhydryloxy, trifluoromethyl, methylmercapto, isopropylidenedioxy, or benzyloxy of the formula

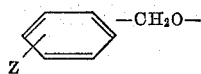

in which Z may be hydrogen, halo, dihalo, alkoxy, or alkyl. $R^2$ is a hydrogen atom or a lower aliphatic hydrocarbon group.

In the above formulas the substituents represented by X, Y, and Z may be in any one of the 2, 3, 4, 5, or 6 positions of the phenyl ring to which they are attached. When the symbols X, Y, and Z refer to disubstitution the two substituents may be adjacently located such as 3,4-, or separated, e.g. 2,5-. The methylenedioxy and isopropylidenedioxy groups, as is obvoius to one skilled in the art, occupy two adjacent positions on the phenyl ring.

Where reference is made herein to a lower hydrocarbon, lower alkyl, or lower alkoxy group, a limit of four carbon atoms is meant. The pharmaceutically acceptable acid addition salts are also contemplated as members of the group of novel substances claimed herein.

This application is a continuation-in-part of our copending application Serial No. 2,571, filed January 15, 1960, which in turn is a continuation-in-part of our previously filed application Serial No. 792,712, filed February 12, 1959, and now abandoned.

The 3,5-diaryl-3-pyrrolidinols of the present invention represent unique structures in organic chemistry. These unusual structures confer upon this series of compounds pharmacological properties not found in the same combination and balance in prior substances.

The compounds of the present invention have utility as therapeutic agents. They possess various useful pharmacological properties including vasopressor-depressor effects, coronary dilator, peripheral vasodilator and vasoconstrictor activity, and papaverine-like smooth muscle depressant effects. The latter particularly characterizes the series. These substances depress many types of mammalian smooth muscles, including the normal actions thereof and also spastic states. They do not appear to function by any particular hormonal blocking action, such as cholinergic or adrenergic blocking action, and have the property of relaxing smooth muscle in the spastic state, regardless of the agent or hormone responsible for the condition.

The specificity of individual substances of the present invention for various types of smooth muscle varies from one member of the series to another, as do their individual degrees of effectiveness as coronary dilators. Thus, some are useful as uterine relaxants, others as bronchodilators, others as intestinal antispasmodics, others as coronary dilators, and still others as ureteral relaxants. Some have central nervous system stimulating properties in addition. The compounds of the present invention may be administered for pharmaceutical purposes by the oral or parenteral routes in doses ranging from 3 to 120 mg./kg. of body weight. Various types of pharmaceutical dosage formulations may be employed, including tablets, capsules, elixirs, solutions, suspensions, etc. Such compositions may contain the present compounds as the sole active ingredient, or they may be combined with other ingredients to provide complementary pharmacologic effects.

As an illustration of compounds of the present invention exhibiting substantial central nervous system stimulating action coupled with a depressant effect on a broad variety of smooth muscles including the trachea, uterus, and ileum, the following may be mentioned: 3-(4-chlorophenyl)-5-phenyl-3-pyrrolidinol, and 3-(4-chlorophenyl)-5-(3,4-methylenedioxyphenyl)-3-pyrrolidinol. In contrast, 3-phenyl-5-(4-chlorophenyl)-3-pyrrolidinol has low central nervous system effects with increased depressant specificity for smooth muscle of the uterus and ileum.

As a further illustration of the type of activity exhibited by compounds of the present invention, 3-(4-chlorophenyl)-5-(3,4-methylenedioxyphenyl)-3-pyrrolidinol and 3-(3,4-dichlorophenyl)-5-phenyl-3-pyrrolidinol are potent coronary dilators. In the isolated perfused rabbit heart with pitressin, these substances are approximately 8 and 20 times as potent as aminophylline respectively. The technique employed for this measurement is similar to that by Anderson and Craver, J. Pharmacol. Exp. Therap. 93, 135 (1948).

The compounds of the present invention are prepared from the corresponding 1-acyl or 1-carbalkoxy-3-pyrrolidinols having the formula:

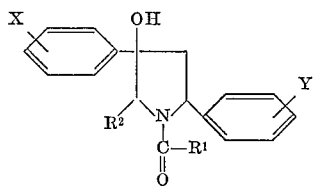

in which the groups X, Y, and $R^2$ have the same meaning as indicated above, and $R^1$ is a lower alkyl or lower alkoxy group. These intermediates are prepared as described in co-pending applications Serial No. 109,269 filed May 11, 1961, by Wu, Feldkamp, and Lobeck, which in turn is a continuation-in-part of application Serial No 792,711, filed February 12, 1959, and now abandoned. The preparation is carried out by hydrolysis or alcoholysis of these intermediates in the presence of strongly alkaline materials such as sodium methoxide, potassium t-butoxide, sodium hydroxide, potassium hydroxide, or calcium oxide, alkoxide, or hydroxide  Strong acid conditions are usually to be avoided since dehydration with loss of the 3-hydroxyl group is likely to occur. The reaction may be conveniently carried out by treatment of the 1-acyl-3-aryl-3-pyrrolidinol with potassium hydroxide in refluxing aqueous n-propanol.

Where the groups X or Y in the above formulas represent hydroxyl groups, the products may also be prepared by hydrogenolysis of the corresponding benzyloxy compounds in the presence of a hydrogenation catalyst such as finely divided platinum, palladium, nickel, rhodium, etc., under moderate conditions of temperature and pressure such as 1 to 5 atmospheres of hydrogen, and room temperature up to about 50° C. The dihydroxy substances are prepared by dilute acid (e.g. 1–5% aqueous hydrochloric acid) hydrolysis of the corresponding isopropylidenedioxy compounds.

Where X or Y represent substituted benzyloxy groups including benzhydryloxy, the products may also be prepared by reaction of the corresponding 1-acyl or 1-carbalkoxy-3-(hydroxyphenyl)-5-aryl-3-pyrrolidinol, or 1-acyl or 1-carbalkoxy-3-aryl-5-(hydroxyphenyl)-3-pyrrolidinol with the desired benzyl halide (e.g. chloride, bromide, or iodide) in the presence of a strong base and a solvent for the reactants. Nearly any reaction inert solvent that will dissolve appreciable quantities of each reactant and of the base employed may be used. The combination of anhydrous acetone and potassium carbonate has been found to be the most universally satisfactory. The base, such as potassium carbonate, must be sufficiently strong to neutralize the phenolic hydroxyl group participating in the process. Such bases are known to those skilled in the art, i.e. bicarbonates generally are too weak while alkali metal carbonates and hydroxides are generally satisfactory. The 1-acyl or 1-carbalkoxy group is then removed as described above to yield the desired product.

The pharmaceutically acceptable acid addition salts are prepared by reaction of the present pyrrolidinols with the appropriate acid. For example, the pyrrolidinols may be dissolved in ether or other suitable solvent and treated with the desired acid. Excesses of strong acids are to be avoided since dehydration of the pyrrolidinol with loss of the 3-hydroxyl group sometimes occurs. Pharmaceutically acceptable salts include the hydrobromides, hydrochlorides, hydroiodides, sulfates, phosphates, acetates, citrates, gluconates, succinates, tartrates, mucates, and benzoates, etc.

EXAMPLE 1

One-tenth mole of 1-carbethoxy-3,5-diphenyl-3-pyrrolidinol is stirred at the reflux temperature for 20 hours with a solution of 25 g. of potassium hydroxide in a mixture of 50 ml. each of n-propyl alcohol and 50 ml. of 10 N aqueous potassium hydroxide. The mixture is then cooled and the alcoholic layer separated and diluted with 400 ml. of isopropyl ether. The ether layer is separated and dried over anhydrous magnesium sulfate. The drying agent is then removed by filtration and the filtrate neutralized with ethanolic hydrogen chloride, resulting in precipitation of the hydrochloride salt of 3,5-diphenyl-3-pyrrolidinol. This product is purified by recrystallization from ethanol-diisopropyl ether and analyzed by standard micro-analytical techniques. The analytical values observed and the melting point for this product are given in Table I. The observed percentage composition is in agreement with the values calculated from the empirical formula. This substance exhibits infrared absorption maxima at the following wave lengths: 1025, 1100, 1490, 1600, 2780, 2880, 2920, 3050, and 3300 cm.$^{-1}$ (potassium bromide pellet).

EXAMPLE 2

1-carbethoxy - 3 - phenyl-5-(4-chlorophenyl)-3-pyrrolidinol, 0.1 mole, is stirred at the reflux temperature for 20 hours with a solution of 25 g. of potassium hydroxide in a mixture of 50 ml. each of n-propyl alcohol and 50 ml. of 10 N aqueous potassium hydroxide. The mixture is then cooled, resulting in formation of a precipitate of the free base form of 3-phenyl-5-(4-chlorophenyl)-3-pyrrolidinol. The cooled mixture is diluted with water, the solid collected, washed with water, and dried. It is purified by recrystallization from isopropanol. The melting point and observed elemental composition of this substance is listed in Table I.

EXAMPLES 3, 4, 7, 8, 9, AND 10

The procedure of Example 2 is applied to the following substances, the preparation of which is described in co-pending application Serial Number 109,269, referred to above. A description of the products obtained and the recrystallization solvents used are listed in Table I.

1-carbethoxy-3-(4-chlorophenyl)-5-phenyl-3-pyrrolidinol
1-carbethoxy-3-phenyl-5-(4-methoxyphenyl)-3-pyrrolidinol
1-carbethoxy-3-phenyl-5-(3,4-methylenedioxyphenyl)-3-pyrrolidinol
1-carbethoxy-3-(4-chlorophenyl)-5-(3,4-methylenedioxyphenyl)-3-pyrrolidinol
1-carbethoxy-3-(3-trifluoromethylphenyl)-5-phenyl-3-pyrrolidinol
1-carbethoxy-3-(3,4-dichlorophenyl)-5-phenyl-3-pyrrolidinol

EXAMPLES 5 AND 6

The procedure of Example 1 is applied to the following substances which are described in copending application Serial Number 109,269 referred to above. The products obtained are described in Table I.

1-carbethoxy-3,5-di(4-chlorophenyl)-3-pyrrolidinol
1-carbethoxy-2-methyl-3,5-diphenyl-3-pyrrolidinol Each of the compounds of the present invention contains two or more asymmetric carbon atoms and is, therefore, capable of existing in various isomeric modifications, including optical isomers and diastereoisomers. Each such form is considered within the scope of the present invention. Furthermore, each of the N-unsubstituted-3,5-diaryl-3-pyrrolidinols of the examples given herein exhibits infrared absorption maxima at the following wave lengths: 1025, 1100, 1490, 1600, 2780, 2880, 2920, 3050, and 3300 cm.$^{-1}$.

Table I
COMPOUNDS OF EXAMPLES 1–10

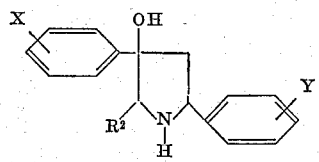

| Ex. No. | X | R² | Y | Form | Melting point, °C. | C | H | Cl ᵃ | N | Recrystallization solvent ᵇ |
|---|---|---|---|---|---|---|---|---|---|---|
| 1 | H | H | H | HCl salt | 206, dec | 70.14 | 6.78 | 12.50 | | EtOH:i-Pr₂O. |
| 2 | H | H | 4-Cl | Base | 162–164 | 70.22 | 5.99 | | 5.21 | i-PrOH. |
|  |  |  |  | HCl salt | 214–215 | 61.18 | 5.49 | 11.47 | 4.51 | i-PrOH:i-Pr₂O. |
| 3 | 4-Cl | H | H | Base | 162–164 | | | | 5.15 | i-PrOH. |
|  |  |  |  | HCl salt | 204–205, dec | 61.87 | 5.59 | 11.14 | | MeOH:i-Pr₂O. |
| 4 | H | H | 4-CH₃O | Base | 167–169 | | | | 5.22 | i-PrOH. |
|  |  |  |  | HCl salt | 164–167, dec | 66.62 | 11.55 | | | i-PrOH. |
| 5 | 4-Cl | H | 4-Cl | HCl salt | 206–207, dec | 55.84 | 4.87 | 10.06 | | EtOH:i-Pr₂O. |
| 6 | H | CH₃ | H | do | 277–278, dec | 70.59 | 7.30 | 12.44 | 4.89 | i-PrOH:i-Pr₂O. |
| 7 | H | H | 3,4-methylenedioxy | HCl salt | 228–229 | 63.64 | 5.97 | 11.20 | 4.04 | i-PrOH:EtOH. |
|  |  |  |  | Base | 151–153 | 71.81 | 5.97 | | 4.94 | i-PrOH:i-Pr₂O. |
| 8 | 4-Cl | H | do | Base | 162–164 | 64.40 | 5.04 | | 4.47 | i-PrOH:i-Pr₂O. |
|  |  |  |  | HCl salt | 203–209 | 57.65 | 5.16 | | 3.95 | EtOH-i-Pr₂O. |
| 9 | 3CF₃ | H | H | Base | 149–151 | 66.47 | 5.09 | | 4.52 | i-PrOH:i-Pr₂O. |
|  |  |  |  | HCl salt | 202–204, dec | 59.43 | 5.12 | 10.45 | 3.98 | i-PrOH-i-Pr₂O. |
| 10 | 3,4-dichloro | H | H | Base | 158–159 | 62.37 | 4.99 | | 4.60 | i-PrOH-i-Pr₂O. |
|  |  |  |  | HCl salt | 206–208, dec | 55.70 | 4.68 | 10.23 | 4.07 | EtOH:i-Pr₂O. |

ᵃ Ionic chlorine.  ᵇ Chemical abstracts abbreviations.

EXAMPLE 11

The Grignard reagent is prepared from 4-bromodiphenyl ether by reaction of 0.15 mole thereof dissolved in approximately 100 ml. of tetrahydrofuran with 0.15 gram atom of magnesium turnings.

A solution of 17.6 g. (0.075 mole) of 1-carbethoxy-5-phenyl-3-pyrrolidinone (Kuhn and Osswald, Chem. Ber. 89, 1423 (1956)) in 50 ml. of tetrahydrofuran is then added in dropwise fashion to a stirred solution of the Grignard reagent and the reaction mixture refluxed for four hours. The flask and contents are cooled in an ice bath and the Grignard complex hydrolyzed by dropwise addition of 50 ml. of saturated aqueous ammonium chloride solution thereto. The organic layer is separated and the aqueous layer extracted with several portions of tetrahydrofuran. The combined organic solutions are then evaporated to dryness. 1-carbethoxy-3-(4-phenoxyphenyl)-3-pyrrolidinol remains as a solid residue, which is recrystallized and then hydrolyzed to the desired end product, 3-(4-phenoxyphenyl)-5-phenyl-3-pyrrolidinol by the method of Examples 1 and 2.

The following compounds listed in Table II are obtained by preparation of the Grignard reagent from the halide listed and treatment thereof as described in Example 11.

Table II

| Product | Halide |
|---|---|
| 3-(4-biphenylyl)-5-phenyl-3-pyrrolidinol | 4-bromobiphenyl. |
| 3-(4-benzyloxyphenyl)-5-phenyl-3-pyrrolidinol. | 4-benzyloxybromobenzene. |
| 3-(4-methylthiophenyl)-5-phenyl-3-pyrrolidinol. | 4-methylthiochlorobenzene. |
| 3-(3,4-isopropylidenedioxyphenyl)-5-phenyl-3-pyrrolidinol. | 3,4-isopropylidenedioxybromobenzene. |
| 3-(4'-bromo-4-biphenylyl)-5-phenyl-3-pyrrolidinol. | 4,4'-dibromobiphenyl. |
| 3-(3-biphenylyl)-5-phenyl-3-pyrrolidinol | 3-bromobiphenyl. |
| 3-[4-(4-chlorophenoxy)phenyl]-5-phenyl-3-pyrrolidinol. | 4,4'-dichlorodiphenyl ether. |
| 3-[4-(4-bromophenoxy)phenyl]-5-phenyl-3-pyrrolidinol. | 4,4'-dibromodiphenyl ether. |
| 3-(4-bromophenyl)-5-phenyl-3-pyrrolidinol. | 1,4-dibromobenzene. |
| 3-(4-fluorophenyl)-5-phenyl-3-pyrrolidinol. | 4-fluorobromobenzene. |
| 3-(2-chlorophenyl)-5-phenyl-3-pyrrolidinol. | 1,2-dichlorobenzene. |
| 3-(o-tolyl)-5-phenyl-3-pyrrolidinol | o-Bromotoluene. |
| 3-(2,5-dimethylphenyl)-5-phenyl-3-pyrrolidinol. | o-Bromo-p-xylene. |
| 3-(p-tolyl)-5-phenyl-3-pyrrolidinol | p-Bromotoluene. |
| 3-(3-chlorophenyl)-5-phenyl-3-pyrrolidinol. | m-Chlorobromobenzene. |
| 3-(2-methoxyphenyl)-5-phenyl-3-pyrrolidinol. | o-Bromoanisole. |
| 3-(3-benzyloxyphenyl)-5-phenyl-3-pyrrolidinol. | 3-benzyloxybromobenzene. |
| 3-(4-ethoxyphenyl)-5-phenyl-3-pyrrolidinol. | p-Bromophenetol. |

EXAMPLE 12

*3-(4-hydroxyphenyl)-5-phenyl-3-pyrrolidinol.*—A mixture of 9.3 g. (0.024 mole) of 3-(4-benzyloxyphenyl)-5-phenyl-3-pyrrolidinol (prepared as described above) in 200 ml. of 75% aqueous ethanol and 0.5 g. of 10% palladium-on-carbon catalyst is agitated in an atmosphere of hydrogen at 50 p.s.i.g. and room temperature until one molecular proportion of hydrogen has been absorbed. The catalyst is then removed by filtration and the filtrate concentrated to dryness at reduced pressure. The remaining residue is an oil which crystallizes on standing. The crystalline material is collected, washed with an appropriate solvent, e.g. ethanol, isopropanol, diisopropyl ether, etc., and dried in the air. It may be recrystallized or first converted to the hydrochloride or other suitable salt and then recrystallized as such.

EXAMPLE 13

(a) *1-carbethoxy-3-(4-hydroxyphenyl)-5-phenyl-3-pyrrolidinol.*—A mixture of 10.0 g. (0.024 mole) of 1-carbethoxy-3-(4-benzyloxyphenyl)-5-phenyl-3-pyrrolidinol in 200 ml. of 75% aqueous ethanol and 0.5 g. of 10% palladium-on-carbon catalyst is agitated in an atmosphere of hydrogen at 50 p.s.i.g. and room temperature until one molecular proportion of hydrogen has been absorbed. The catalyst is then removed by filtration and the filtrate concentrated in dryness at reduced pressure. The remaining residue is 1-carbethoxy-3-(4-hydroxyphenyl)-5-phenyl-3-pyrrolidinol which serves as an intermediate for transformation as follows.

(b) *3-[4-(4-chlorobenzyloxy)phenyl]-5-phenyl-3-pyrrolidinol.*—A mixture of 4.4 g. (0.027 mole) of 4-chlorobenzyl chloride, 8.8 g. (0.027 mole) of 1-carbethoxy-3-(4-hydroxyphenyl)-5-phenyl-3-pyrrolidinol (Example 13(a)), 3.75 g. (0.027 mole) of anhydrous potassium carbonate and 10 ml. of dry acetone is refluxed with stirring for five hours. The mixture is then transferred to a separatory funnel and mixed with 200 ml. of water and 200 ml. of ether. The ether layer is separated, washed in turn with 50 ml. of 10% aqueous sodium hydroxide, and water, the ether distilled, and the residue hydrolyzed as in Examples 1 and 2 to yield 3-[4-(4-chlorobenzyloxy)phenyl]-5-phenyl-3-pyrrolidinol as a residue which is purified by recrystallization.

The substituted 4-benzyloxyphenyl-3-pyrrolidinols listed in Table III are obtained as described in Example 13 from the benzyl halides listed.

Table III

| Product | Halide |
| --- | --- |
| 3-[4-(2-chlorobenzyloxy)phenyl]-5-phenyl-3-pyrrolidinol. | 2-chlorobenzyl chloride. |
| 3-[4-(3,4-dichlorobenzyloxy)phenyl]-5-phenyl-3-pyrrolidinol. | 3,4-dichlorobenzyl chloride. |
| 3-[4-(4-methoxybenzyloxy)phenyl]-5-phenyl-3-pyrrolidinol. | 4-methoxybenzyl chloride. |
| 3-[4-(4-ethylbenzyloxy)phenyl]-5-phenyl-3-pyrrolidinol. | 4-ethylbenzyl chloride. |
| 3-[4-(4-fluorobenzyloxy)phenyl]-5-phenyl-3-pyrrolidinol. | 4-fluorobenzyl chloride. |
| 3-[4-(4-bromobenzyloxy)phenyl]-5-phenyl-3-pyrrolidinol. | 4-bromobenzyl bromide. |
| 3-(4-benzhydryloxyphenyl)-5-phenyl-3-pyrrolidinol. | Benzhydryl bromide. |

In analogous fashion the substituted benzyl halides listed in Table III are allowed to react with 1-carbethoxy-3-(3-benzyloxyphenyl)-5-phenyl-3-pyrrolidinol according to the procedure of Example 13. The pyrrolidinols listed in Table IV are obtained.

Table IV

| Product | Halide |
| --- | --- |
| 3-[3-(2-chlorobenzyloxy)phenyl]-5-phenyl-3-pyrrolidinol. | 2-chlorobenzyl chloride. |
| 3-[3-(3,4-dichlorobenzyloxy)phenyl]-5-phenyl-3-pyrrolidinol. | 3,4-dichlorobenzyl chloride. |
| 3-[3-(4-methoxybenzyloxy)phenyl]-5-phenyl-3-pyrrolidinol. | 4-methoxybenzyl chloride. |
| 3-[3-(4-ethylbenzyloxy)phenyl]-5-phenyl-3-pyrrolidinol. | 4-ethylbenzyl chloride. |
| 3-[3-(4-fluorobenzyloxy)phenyl]-5-phenyl-3-pyrrolidinol. | 4-fluorobenzyl chloride. |
| 3-[3-(4-bromobenzyloxy)phenyl]-5-phenyl-3-pyrrolidinol. | 4-bromobenzyl bromide. |
| 3-(3-benzhydryloxyphenyl)-5-phenyl-3-pyrrolidinol. | Benzhydryl bromide. |

EXAMPLE 14

*3-(3,4-dihydroxyphenyl)-5-phenyl-3-pyrrolidinol.*—One-tenth mole of 3-(3,4-isopropylidenedioxyphenyl)-5-phenyl-3-pyrrolidinol is dissolved in 50 ml. of 3% aqueous hydrochloric acid in a 250 ml. Erlenmeyer flask which is warmed in a water bath at 50° C. for 1.5 hours. The solution is then concentrated to dryness at room temperature in vacuo, and the residue recrystallized from a suitable solvent.

Compositions in dosage unit form containing the compounds of this invention may be prepared by conventional pharmaceutical methods. For this purpose both solid and liquid carriers, excipients, and diluents may be used along with suspending agents, stabilizers, preservatives, lubricants, etc., as desired. Examples of suitable carriers include corn starch, lactose, calcium phosphate, polyethylene glycol, water, sesame oil, peanut oil, propylene glycol, ethanol, etc. Dosage unit forms such as tablets or capsules for oral use and ampoules of solutions or suspensions for injection containing from 100 to 400 mg. of active ingredient are suitable.

The physician will determine the specific dosage form, size, and frequency for each individual patient. The range of suitable dosages has been stated above. Single doses of the order of 100 to 400 mg. are preferred. Specific examples of suitable dosage unit compositions are given below.

EXAMPLE 15

Tablets containing 3-(4-chlorophenyl)-5-phenyl-3-pyrrolidinol hydrochloride are prepared as follows:

| Ingredients | Weight per tablet, mg. | Weight per 100,000 tablets, kg. |
| --- | --- | --- |
| 3-(4-chlorophenyl)-5-phenyl-3-pyrrolidinol hydrochloride | 200 | 20 |
| Calcium phosphate, dibasic | 100 | 10.0 |
| Lactose | 70 | 7.0 |
| Starch, corn | 28 | 2.8 |
| Magnesium stearate | 2 | 0.2 |
| Total weight | 400 | 40.0 |

For a 100,000 tablet batch the above amounts of 3-(4-chlorophenyl-5-phenyl-3-pyrrolidinol hydrochloride, calcium phosphate, lactose and 2.2 kg. of the corn starch are dry blended and then wet granulated with 6 kg. of 10% aqueous corn starch paste. The resulting granulation is screened, dried, and rescreened. The granules are then coated with the magnesium stearate, which serves as a tableting lubricant, and the finished granules are compressed into tablets weighing 400 mg. each, using ordinary tableting equipment and methods.

EXAMPLE 16

A dry blend of the following ingredients is prepared:

| | Kg. |
| --- | --- |
| 3-phenyl-5-(4-chlorophenyl)-3-pyrrolidinol hydrochloride | 20.0 |
| Lactose | 4.8 |
| Magnesium stearate | 0.2 |
| Total | 25.0 |

This mixture is then employed to fill No. 2 hard gelatin capsules, each with 250 mg. of the blend. If desired, the same blend may be filled into larger capsules each containing 500 mg. of the blend.

EXAMPLE 17

A solution for injection is prepared as follows: finely divided 3 - (4 - chlorophenyl) - 5 -(3,4-methylenedioxyphenyl)-3-pyrrolidinol hydrochloride, 250 g., is dissolved in 9 l. of water for injection, U.S.P. The pH of the solution is adjusted to 5.7±0.1 using dilute aqueous sodium hydroxide or hydrochloric acid as required. The solution is filtered sparkling clear, and 4 ml. thereof is filled into each of a group of ampoules made of type I glass, and sealed. The sealed ampoules are sterilized by heating in an autoclave at 121° C. for 15 minutes.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

What is claimed is:

1. A compound selected from the group consisting of

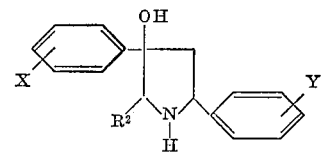

and the pharmaceutically acceptable acid addition salts thereof wherein X and Y are independently selected from the group consisting of hydrogen, hydroxy, dihydroxy, halo, dihalo, alkyl, dialkyl, alkoxy, phenoxy, halophenoxy, phenyl, halophenyl, methylenedioxy, benzhydryloxy, trifluoromethyl, methylmercapto, isopropylidenedioxy, and

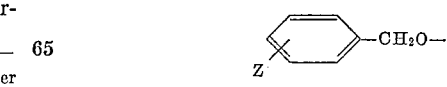

wherein Z is selected from the group consisting of hydrogen, halo, dihalo, lower alkoxy, and lower alkyl, each of said alkyl and alkoxy groups having up to four carbon atoms, and $R^2$ is selected from the group consisting of hydrogen and lower alkyl groups having up to four carbon atoms.

2. A compound as claimed in claim 1 wherein $R^2$ and Y are hydrogen and X is halo.

3. A compound as claimed in claim 1 wherein $R^2$ and Y are hydrogen and X is dihalo.

4. A compound as claimed in claim 1 wherein $R^2$ and X are hydrogen and Y is halo.

5. A compound as claimed in claim 1 wherein $R^2$ is hydrogen, X is halo, and Y is methylenedioxy.

6. 3-(4-chlorophenyl)-5-phenyl-3-pyrrolidinol.

7. 3-(3,4-dichlorophenyl)-5-phenyl-3-pyrrolidinol.

8. 3 - (4-chlorophenyl)-5-(3,4-methylenedioxyphenyl)-3-pyrrolidinol.

9. 3-phenyl-5-(4-chlorophenyl)-3-pyrrolidinol.

References Cited in the file of this patent

UNITED STATES PATENTS

| | | |
|---|---|---|
| 2,852,526 | Villani et al. | Sept. 16, 1958 |
| 2,878,264 | Lunsford | Mar. 17, 1959 |
| 2,902,404 | Spencer | Sept. 1, 1959 |
| 2,976,213 | Murphey | Mar. 21, 1961 |

OTHER REFERENCES

Wagner Zook: "Synthetic Organic Chemistry," page 415 (1953).